US012106921B2

United States Patent

(12) United States Patent
Kanapady et al.

(10) Patent No.: US 12,106,921 B2

(45) Date of Patent: Oct. 1, 2024

(54) ALUMINUM ALLOY MINIATURE CARTRIDGE FUSES

(71) Applicant: EATON INTELLIGENT POWER LIMITED, Dublin (IE)

(72) Inventors: Ramdev Kanapady, Campbell, CA (US); Hui Calvin Yang, Shanghai (CN)

(73) Assignee: Eaton Intelligent Power Limited, Dublin (IE)

(*) Notice: Subject to any disclaimer, the term of this patent is extended or adjusted under 35 U.S.C. 154(b) by 188 days.

(21) Appl. No.: 17/679,961

(22) Filed: Feb. 24, 2022

(65) Prior Publication Data

US 2022/0181109 A1 Jun. 9, 2022

Related U.S. Application Data

(63) Continuation-in-part of application No. 16/404,093, filed on May 6, 2019, now Pat. No. 11,348,754.

(51) Int. Cl.

*H01H 85/041* (2006.01)
*H01H 85/165* (2006.01)

(52) U.S. Cl.

CPC ...... *H01H 85/0418* (2013.01); *H01H 85/165* (2013.01)

(58) Field of Classification Search

CPC ............. H01H 85/0418; H01H 85/165; H01H 85/0082; H01H 85/17; H01H 85/175

See application file for complete search history.

(56) References Cited

U.S. PATENT DOCUMENTS 1,278,911 A * 9/1918 Griffith ................ H01H 85/143 337/232
1,852,104 A * 4/1932 Bowie .................... H01H 85/38 337/248

(Continued)

FOREIGN PATENT DOCUMENTS

CN 86103542 A 12/1987
CN 1387214 A 12/2002

(Continued)

OTHER PUBLICATIONS

"Fuse Device", Dec. 27, 2017, HIS Renewables GMBH, Entire Document (Translation of EP 3261109). (Year: 2017).*

(Continued)

*Primary Examiner* — Stephen S Sul

(74) *Attorney, Agent, or Firm* — Baker Botts L.L.P.

(57) ABSTRACT

A high-capacity miniature cartridge fuse is provided. The fuse includes a housing, a fusible element, and first and second ferrules fabricated from aluminum alloy. The aluminum alloy ferrules is fabricated to withstand high pressure generated inside the housing as a result of arcing and to stay in place after repeated temperature and pressure changes caused by at least one of i) current or ii) arcing during short circuit events. The aluminum alloy plated with a first metal plating fabricated from a first metal different from the aluminum alloy and a second metal plating fabricated from a second metal different from the first metal, the second metal plating overlaying the first metal plating. Each of the first and second ferrules includes a side wall and an end wall, wherein the end wall includes a boss extending toward an interior of the housing.

20 Claims, 10 Drawing Sheets

(56) References Cited

U.S. PATENT DOCUMENTS

| | | | | | |
|---|---|---|---|---|---|
| 3,246,107 | A * | 4/1966 | Ebensteiner | H01H 37/5409 | 337/365 |
| 3,692,924 | A * | 9/1972 | Nye | H01H 85/0241 | 174/120 SR |
| 3,750,075 | A | 7/1973 | Cooper, Jr. | | |
| 3,772,075 | A | 11/1973 | Tarnopol et al. | | |
| 3,781,454 | A | 12/1973 | Olsen | | |
| 3,869,689 | A | 3/1975 | Kasamatu | | |
| 4,057,774 | A | 11/1977 | Arikawa et al. | | |
| 4,297,666 | A | 10/1981 | Asdollahi | | |
| 4,517,544 | A | 5/1985 | Spaunhorst | | |
| 4,651,140 | A | 3/1987 | Duggan | | |
| 4,703,300 | A | 10/1987 | Gaia | | |
| 4,736,180 | A | 4/1988 | Oh | | |
| 4,752,760 | A | 6/1988 | Clark | | |
| 5,198,792 | A | 3/1993 | Bacon et al. | | |
| 5,859,581 | A | 1/1999 | Morris | | |
| 5,994,994 | A | 11/1999 | Ito | | |
| 6,018,288 | A | 1/2000 | Waite et al. | | |
| 6,190,803 | B1 | 2/2001 | Tomiyama et al. | | |
| 6,456,189 | B1 | 9/2002 | Mosesian et al. | | |
| 6,542,217 | B2 * | 4/2003 | Boyd | H01C 1/16 | 352/85 |
| 7,160,039 | B2 | 1/2007 | Hargis et al. | | |
| 10,450,640 | B2 | 10/2019 | Chakrabarti et al. | | |
| 11,348,754 | B2 * | 5/2022 | Kanapady | H01H 69/02 | |
| 2005/0168315 | A1 * | 8/2005 | Brown | H01H 85/05 | 337/248 |
| 2010/0245025 | A1 | 9/2010 | de Leon et al. | | |
| 2011/0079427 | A1 | 4/2011 | Powale et al. | | |
| 2011/0279218 | A1 | 11/2011 | Salonga et al. | | |
| 2012/0204750 | A1 | 8/2012 | Sullivan | | |
| 2014/0062266 | A1 | 3/2014 | Qin et al. | | |
| 2016/0126557 | A1 | 5/2016 | Kataoka et al. | | |
| 2016/0268091 | A1 * | 9/2016 | Kanapady | H01H 85/201 | |
| 2016/0380247 | A1 | 12/2016 | Juzkow et al. | | |
| 2017/0125785 | A1 | 5/2017 | Burkman et al. | | |
| 2017/0256770 | A1 | 9/2017 | Wynn et al. | | |
| 2018/0102234 | A1 | 4/2018 | Bruan et al. | | |
| 2018/0123263 | A1 | 5/2018 | Brantingham | | |
| 2018/0204700 | A1 | 7/2018 | Brosas et al. | | |
| 2018/0254163 | A1 | 9/2018 | Lee | | |
| 2020/0357593 | A1 | 11/2020 | Kanapady | | |
| 2021/0068810 | A1 | 3/2021 | Federspiel et al. | | |

FOREIGN PATENT DOCUMENTS

| | | | | |
|---|---|---|---|---|
| CN | 201069752 | Y | 6/2008 | |
| CN | 203339091 | U | 12/2013 | |
| CN | 203406255 | U | 1/2014 | |
| CN | 206441687 | U | 8/2017 | |
| DE | 29511129 | U1 | 10/1996 | |
| EP | 3261109 | A1 * | 12/2017 | H01H 69/02 |
| GB | 1167583 | A | 10/1969 | |
| GB | 1474695 | A | 5/1977 | |
| GB | 2032205 | A * | 4/1980 | H01H 69/022 |
| GB | 2410626 | A | 8/2005 | |

OTHER PUBLICATIONS

Copper vs. Aluminum Conductor, Cooper Power Series, Publication No. PA202008EN, Nov. 2016.

Pryor et al., A Comparison of Aluminum vs. Copper as Used in Electrical Equipment, GE Consumer and Industrial, 2008.

ASANO, "Ferrule (Aluminum)", Dec. 20, 2017, Entire Document (webpage for the prior art called ASANO used in the Office action.) (Year: 2017).

Psomopoulos et al., "Temperature distribution of fuse elements during the pre-arcing period", Electric Power Systems Research 61, 2002, 161-167, DOI:10.1016/S0378-7796(02)00014-7.

Search Report Issued in corresponding GB Application No. GB2006575.1, dated Oct. 13, 2020, 3 pages.

"7050 Aluminum", Smiths Metal Centres, Technical Datasheet, 2018.

Rambabu et al., "Aluminium Alloys for Aerospace Applications", Springer Science + Business Media, Aerospace Materials and Material Technologies, Indian Institute of Metal Series, Chapter 2, 2017, DOI: 10.1007/978-981-10-2134-3_2.

AZoM: "Aluminium / Aluminum 6063 Alloy (UNS A96063)", dated Sep. 27, 2012, 4 pages.

AZoM: "Aluminium / Aluminum 7050 Alloy (UNS A97050)", dated Sep. 18, 2012, 3 pages.

"6063", Aluminum Alloy Data Sheet, Atlas Steels, revised Oct. 2013.

Koch, "Aluminum Alloys for Wire Harnesses in Automotive Engineering", BHM Berg- und Hüttenmännische Monatshefte, 152(2):62-67, Mar. 2007, DOI: 10.1007/s00501-007-0275-z.

Psomopoulos et al., "Measurement of fusible elements during current interruption and interpretation of related phenomena", Measurement 32, 2002, 15-22, DOI:10.1016/S0263-2241(01)00054-9.

Rochette et al., "Pressure evolution during HBC fuse operation", Plasma Sources Science and Technology, 13 (2004), 293-302, published Apr. 26, 2004, DOI: 10.1088/0963-0252/13/2/015.

International Search Report and Written Opinion for International Application No. PCT/EP2023/025085, 6 pages, Jun. 19, 2023.

* cited by examiner

ALUMINUM ALLOY MINIATURE CARTRIDGE FUSES

CROSS REFERENCE TO RELATED APPLICATIONS

This application is a continuation-in-part of U.S. patent application Ser. No. 16/404,093 filed on May 6, 2019, entitled "Aluminum Alloy Miniature Cartridge Fuses," the entirety of which is hereby incorporated by reference in its entirety.

BACKGROUND

The field of the disclosure relates generally to electrical fuses, and more particularly to miniature cartridge fuses having aluminum ferrules.

Fuses are widely-used overcurrent protection devices to open electrical circuits and prevent associated components from being damaged by overcurrent in an electrical system. Because fuses, especially miniature cartridge fuses, are high-volume electrical components, even an incremental cost reduction in manufacture of fuses, without sacrificing performance, has great value. Improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

Figure 1A:
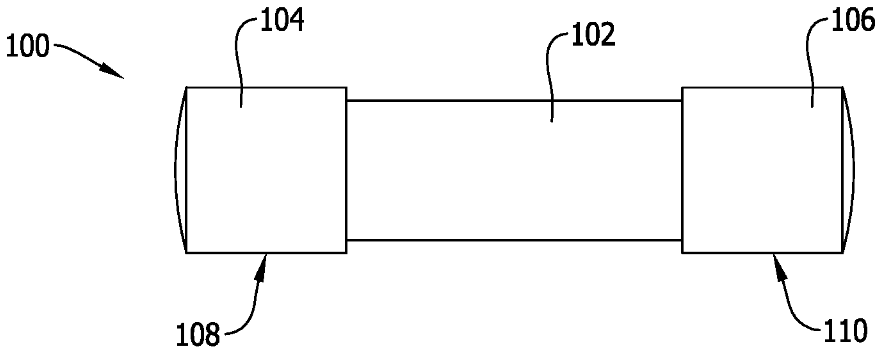
FIG. 1A is a perspective view of an exemplary fuse.

Fuses are sacrifice elements widely used to protect other components in an electrical system. In the U.K., fuses are often integrated into the plugs of electrical devices. These types of fuses are sometimes referred to as miniature cartridge fuses.

Fuse components, except the housing and the filler if any, are typically made of copper or copper alloy. Although aluminum is more than three times cheaper than copper, aluminum has not conventionally been used in miniature cartridge fuses, especially for ferrules of miniature fuses. Aluminum has instead been considered generally unsuitable for miniature fuses because it is significantly weaker than copper or copper alloy, raising concern whether aluminum components may reliably withstand expected operating conditions of the fuse in use, including, for example, concerns whether the aluminum ferrules could effectively withstand high pressure generated inside the housing and stay in place after repeated temperature and pressure changes caused by current or by arcing during short circuit events and whether operational reliability could be ensured.

Inventive fuses disclosed herein, contrary to longstanding beliefs in the art, overcome the limitations of aluminum while ensuring that circuit protection and performance are not compromised, and therefore achieve desired cost reduction in the manufacture of miniature cartridge fuses. Lower cost components such as ferrules and/or fusible wires and/or eyelets fabricated from aluminum alloy are employed to reduce amounts of traditional copper or copper alloy in the manufacture of the fuse. To meet the unique demands and challenges of miniature cartridge fuse design, suitable types of aluminum alloy are strategically evaluated and selected based on their particular attributes and characteristics, and with appropriate structural modification of certain components and enhanced methods of manufacture, fuse component design and assemblies that reliably meet performance specifications of miniature fuses at reduced manufacturing cost can be ensured.

In a first aspect, an inventive aluminum alloy fuse includes ferrules, fusible wires, and/or eyelets made of aluminum alloy that is plated with nickel by electroless plating. Electroless plating allows a reliable coating of aluminum or aluminum alloy with nickel to prevent oxidization that may otherwise occur. A fuse of consistent electrical resistance is therefore possible such that the resistance of the fuse does not undesirably increase over time.

In a second aspect, an inventive aluminum alloy fuse is made of aluminum alloy that is strategically selected based on its strength and melting point such that the fuse can withstand the internal pressure and temperature changes often caused by arcing during short circuit events as the fuse operates. The fuse is also designed to remain intact and has a high decap force on its ferrules required to dislodge the ferrules. A low diameter tolerance between the ferrules and the housing increases the friction between them and thus increases the required decap force. The fuse is therefore cheaper yet still suitable for the desired performance and functions.

In a third aspect, an inventive aluminum alloy time delay fuse includes aluminum alloy strategically selected based on its thermal conductivity. Aluminum alloy that has a thermal conductivity close to that of brass allows the fusible wire to heat up and reach melting temperature when an above-rated current is conducted through the fuse after a certain period of time to retain the functionality of a conventional time delay fuse.

In a fourth aspect, a method of fabricating a high-capacity miniature cartridge fuse is realized. The method includes providing a cylindrical housing and a sheet of aluminum alloy. The method further includes constructing a ferrule from the sheet of aluminum alloy by a deep-drawn process, plating the ferrule with nickel, inserting a fusible wire inside the housing, and inserting the first or second end of the fusible wire through an eyelet. The method also includes turning the first or second end of the fusible wire away from a body of the fusible wire, and inserting the first or second end of the fuse into the interior receptacle of the ferrule such that the first or second end of the fusible wire is held between a portion of the eyelet and the end wall of the ferrule. The mechanical and electrical connection is completed via securing the ferrule onto the housing by clamping the ferrule around the first or second end of the housing. The fabrication method is efficient and provides cheaper fuses that replace copper with aluminum alloy but still meet the desired specifications and performance.

The aluminum alloy fuse and fabrication methods meet longstanding and unfulfilled needs in the art in reducing the cost for fuses by strategically choosing aluminum alloy based on the desired performance and functionality and designing the fuses to overcome the performance differences and limitations of aluminum alloy from copper or copper alloy. In the contemplated embodiments, the inventive aluminum alloy fuses significantly reduce the costs over conventional fuses made of copper or copper alloy.

While described in the context of a miniature cartridge fuse, the inventive concepts herein are not necessarily limited to such specific type of fuses. The following description is therefore provided for the sake of illustration rather than limitation. Method aspects of assembling a fuse will be in part apparent and in part explicitly discussed in the following description.

FIG. 1A illustrates an exemplary fuse 100. Fuse 100 includes a housing 102, a first ferrule 104, and a second ferrule 106. A housing can also be referred to as a fuse body or tube. A ferrule can be referred to as a terminal or an end cap. First ferrule 104 and second ferrule 106 couple to housing 102 at first or second end 108, 110 of housing 102. First and second ferrules 104, 106 respectively surround and cover first and second end 108, 110 of housing 102.

In the exemplary embodiment, housing 102 is cylindrical. A fuse having a cylindrical housing can be referred to as a cartridge fuse. Alternatively, housing 102 is in any other shape that enables the housing to function as described herein, including but not limited to elliptical, square, rectangular, or combinations thereof. Housing 102 may be made of glass, ceramic, or other electrically non-conductive material.

In the exemplary embodiment, ferrule 104, 106 is made of aluminum alloy. Aluminum alloy for ferrule 104, 106 is chosen such that ferrule 104, 106 holds onto housing 102 after repeated expansion due to heat, and its electrical performance does not degrade over time. Ferrule 104, 106 may be mass-produced by a deep-drawn process.

Figure 1B:
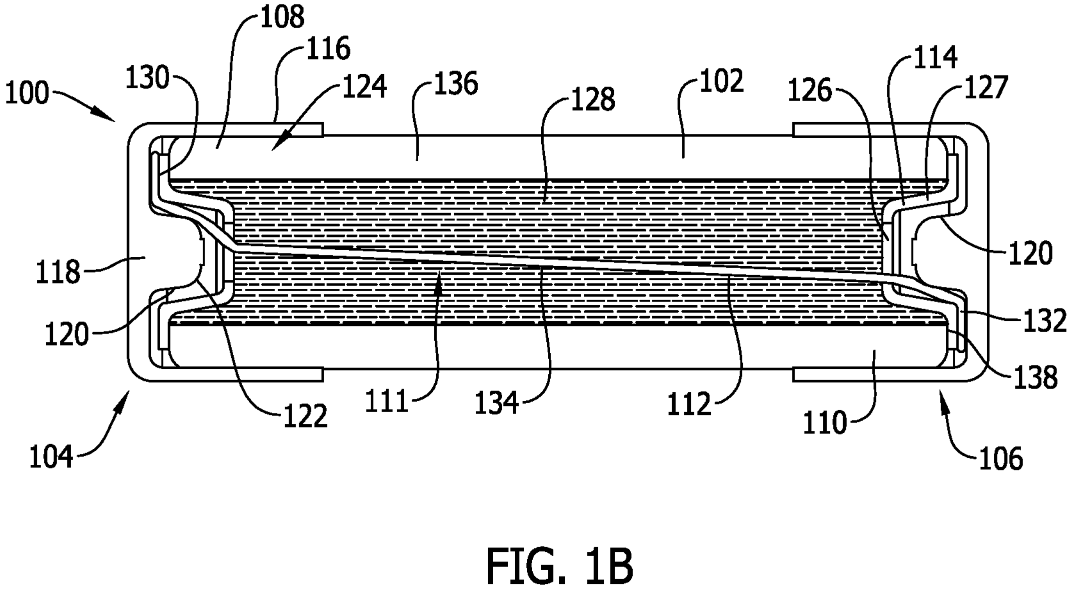
FIG. 1B is a cross-sectional view of the fuse shown in FIG. 1A.

FIG. 1B shows a cross-sectional view of fuse 100 and like reference numerals used in FIG. 1A are used to identify like components illustrated in FIG. 1B. Fuse 100 further includes a fusible wire 112. In some embodiments, fuse 100 includes an eyelet 114.

In the exemplary embodiment, ferrule 104, 106 includes a side wall 116 and an end wall 118. End wall 118 extends from side wall 116 and closes first or second end 108, 110 of housing 102. End wall 118 may include a boss 120. Boss 120 extends inwardly toward housing 102 and defines an interior surface 122 of end wall 118. Boss 120 may be frusto-conical. End wall 118 and side wall 116 define an interior receptacle 124.

In the exemplary embodiment, fusible wire 112 is a wire that structurally fails when current flown through the wire is greater than a threshold value, and opens the circuit to protect other electrical components in the circuit. Fusible wire 112 is made of zinc, copper, silver, aluminum, or other metal or alloys to provide such characteristics. Fusible wire 112 is positioned inside housing 102 and electrically connected to first and second ferrule 104, 106 respectively at first and second ends 130, 132 of fusible wire 112.

In the exemplary embodiment, eyelet 114 includes an aperture 126. Aperture 126 may be disposed in the center of eyelet 114. Eyelet 114 may further include a bulge 127 that arches toward the interior of housing 102. Aperture 126 may be positioned in bulge 127. Bulge 127 has a mating surface with that of boss 120 of end wall 118 of first or second ferrule 104, 106. Eyelet 114 is made of aluminum, copper, aluminum alloy, brass, or other copper alloy. Alternatively, eyelet 114 is made of other material that enables the eyelet to function as described here. Eyelet 114 may be mass-produced by a deep-drawn process.

Fuse 100 further includes a filler 128 filled inside housing 102. Filler 128 is used to contain arc energy during short-circuit events. Filler 128 may be made of silica sand or a mixture of silica sand with other materials such as resin, gypsum, or zeolites.

To fabricate fuse 100, first or second end 130, 132 of fusible wire 112 is inserted through aperture 126 of eyelet 114. In some embodiments, first or second end 130, 132 turns away from a body 134 of fusible wire 112 and toward a wall 136 of housing 102. Fusible wire 112 may be disposed diagonally inside housing 102. Eyelet 114 may be disposed adjacent interior surface 122 of end wall 118. In some embodiments, first and/or second end 130, 132 of fusible wire 112 and/or an edge 138 of eyelet 114 may be tucked between end wall 118 of ferrule 104, 106 and first and/or second end 108, 110 of housing 102. In one embodiment, first and/or second end 130, 132 of fusible wire 112 may be tucked between mating surfaces of boss 120 and eyelet 114. Housing 102 is inserted into interior receptacle 124 formed by ferrule 104, 106. In some embodiments, ferrule 104, 106 is secured onto housing 102 by clamping side wall 116 onto wall 136 of housing 102.

In operation, fusible wire 112 is electrically connected to ferrule 104, 106. If eyelet 114 is used in fuse 100, eyelet 114 is also electrically connected to fusible wire 112.

Fuse 100 may be a high capacity miniature cartridge fuse. As used herein, "high capacity" refers to high breaking capacity as defined in standards of the International Electrotechnical Commission (IEC), such as for example, IEC 60127 fuses having a maximum breaking capacity of up to 1500 Ampere or BS 1362 fuses having a maximum breaking capacity of up to 6000 Ampere. Miniature fuses are relatively small in physical dimensions, e.g., 5 mm×20 mm, or 6.3 mm×32 mm. In some embodiments, side wall 116 of ferrule 104, 106 has a thickness of 0.50 mm or less.

Figure 2A:
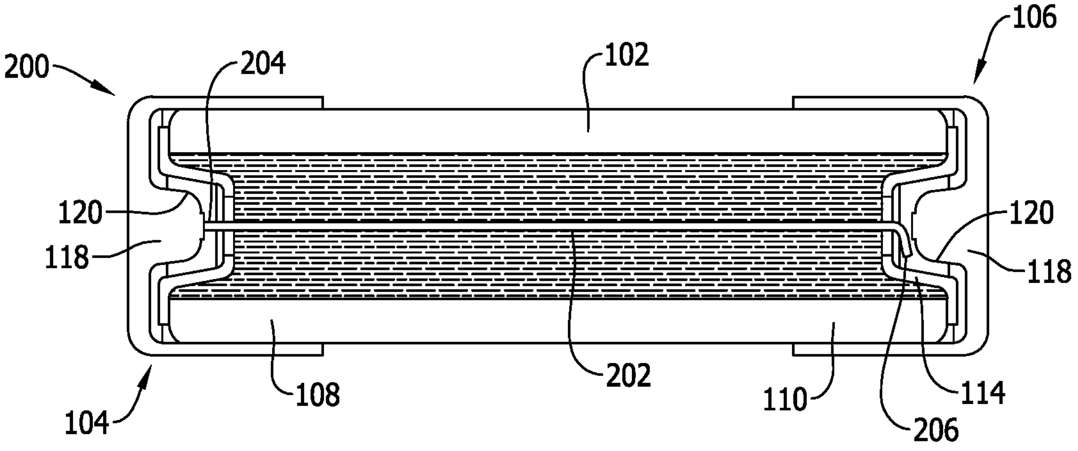
FIG. 2A is another exemplary fuse.

FIG. 2A shows another exemplary fuse 200 and like reference numerals in FIGS. 1A and 1B are used to identify like components illustrated in FIG. 2. A fusible wire 202 is held in place by eyelet 114. Compared to FIG. 1B, a first end 204 of fusible wire 202 is directly attached to boss 120 of ferrule 104, and a second end 206 of fusible wire 202 does not extend all the way along mating surfaces between eyelet 114 and boss 120 of end wall 118 such that end 206 is disposed beneath eyelet 114 but not between end 110 of housing 102 and end wall 118 of ferrule 106.

Figure 2B:
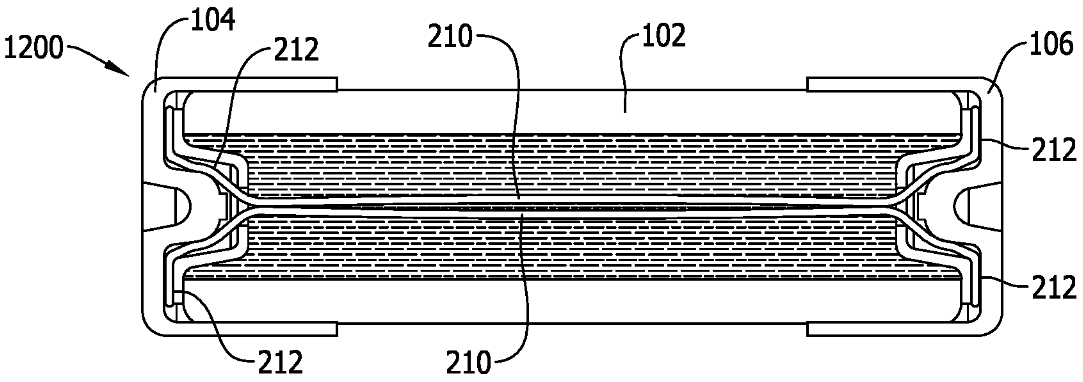
FIG. 2B is one more exemplary fuse.

FIG. 2B shows one more exemplary fuse 1200 and like reference numerals in FIGS. 1A and 1B are used to identify like components illustrated in FIG. 2B. Compared to FIG. 1B, fuse 1200 includes more than one fusible wire 210. Ends 212 of fusible wire 210 may be disposed at the same side of housing 102 as shown in FIG. 2B, or may be disposed diagonally inside housing 102 as shown in FIG. 1B. Alternatively, ends 212 may be disposed inside housing 102 in any other configuration that enables the fusible wires to function as described herein, for example, the ends of the fusible wire may be placed adjacent to any location on ferrule 104, 106. Further, fuse 1200 may have three or more fusible wires 210. With more numbers of fusible wires 210, fuse 1200 has higher current carrying capacity than fuse 100 having a single fusible wire 112.

Figure 2C:
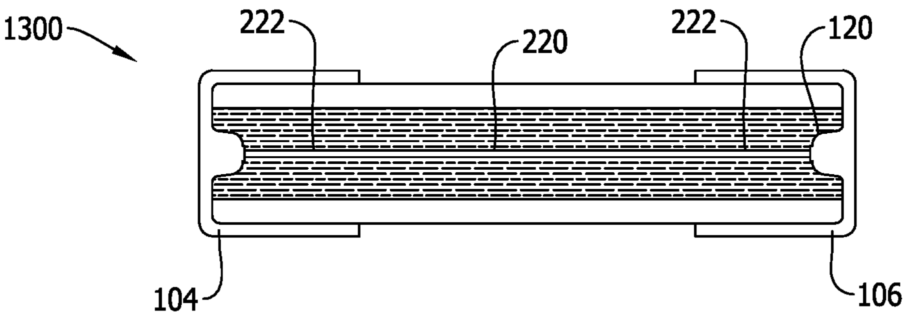
FIG. 2C is yet another exemplary fuse.

FIG. 2C shows yet another exemplary fuse 1300 and like reference numerals in FIGS. 1A and 1B are used to identify like components illustrated in FIG. 2C. Compared to FIG. 1B, fuse 1300 does not include eyelet 114. A fusible wire 220 of fuse 1300 is directly electrically connected to ferrule 104, 106, via methods such as soldering ends 222 with ferrule 104, 106, or with boss 120 if ferrule 104, 106 includes boss 120. Besides fusible wire 112, 202, 210, 220, the fusible element of fuse 100, 200, 1200, 1300 may be other types of fusible elements that enable the fuse to function as described herein.

Besides ferrule 104, 106, fusible wire 112, 202 and/or eyelet 114 may be made of aluminum alloy. Compared to copper or copper alloy, aluminum alloy has significant different characteristics. Table 1 below lists the comparison.

When the melting point of aluminum alloy is used to choose the type of aluminum alloy, the melting point of the chosen aluminum alloy should be high enough for ferrule 104, 106, and for eyelet 114 if aluminum alloy is used for eyelet 114, to withstand the heat generated by current and remain intact to contain arc energy inside fuse 100, 200. In some embodiments, aluminum alloy used for fuse 100, 200 has a melting point of approximately 590° C. or higher.

When a high breaking capacity is desired, the type of aluminum alloy is chosen to have relatively high thermal conductivity and melting temperature. In some embodiments, AL 5005 alloy is used to achieve high breaking capacity for its relatively high melting point and relatively high thermal conductivity.

When a deep-drawn process is used to fabricate ferrule 104, 106 and eyelet 114 from aluminum alloy, the chosen aluminum alloy has high enough elongation needed for the manufacturing process to fabricate parts of designed shapes without breaking. The aluminum alloys listed in Table 1 have sufficient elongation to withstand the deep-drawn process.

Surface oxidation of aluminum or aluminum alloy tends to be rapid. As a result, the contact resistance of fusible wire 112, 202 increases over time, and causes the current through ferrule 104, 106 to decrease, which leads to malfunction of fuse 100, 200. In the exemplary embodiment, nickel plating is used to plate aluminum alloy. Copper or copper alloy may also be plated with nickel. Conventional plating method

| | Cu 27000 | AL 1100 | AL 5052 | | | AL 5005 | | | AL 5154 |
|---|---|---|---|---|---|---|---|---|---|
| Tensile Strength $\sigma_S$ (MPa) | 400 | 89.6 | 228 | 262 | 276 | 138 | 159 | 179 | 269 |
| Yield Strength $\sigma_Y$ (MPa) | 315 | 20 | 193 | 214 | 241 | 117 | 138 | 165 | 207 |
| Elongation (%) | 35 | 15 | 12 | 16 | 8 | 11 | 8 | 6 | 15 |
| Resistivity ρ ($10^{-6}$ Ω-cm) | 6.4 | 2.99 | 4.99 | 4.99 | 4.99 | 3.32 | 3.32 | 3.32 | 5.32 |
| Melting Point (° C.) | 905-930 | 643-657 | 590-640 | 590-640 | 590-640 | 632-654 | 632-654 | 632-654 | 593-643 |
| Thermal Conductivity K (W/mK) | 116 | 222 | 138 | 138 | 138 | 200 | 200 | 200 | 125 |
| Youngs Modulus E (GPa) | 105 | 68.9 | 70.3 | 70.3 | 70.3 | 68.9 | 68.9 | 68.9 | 70.3 |

The types of aluminum alloy and the designs of the fuses are strategically determined to meet requirements for specific applications and power systems. In choosing the type of aluminum alloy to be used for fuse 100, 200, strength, such as tensile strength a and yield strength $\sigma_Y$, and melting point are considered. Other characteristics such as elongation, resistivity, and thermal conductivity are also considered.

Figure 3A:
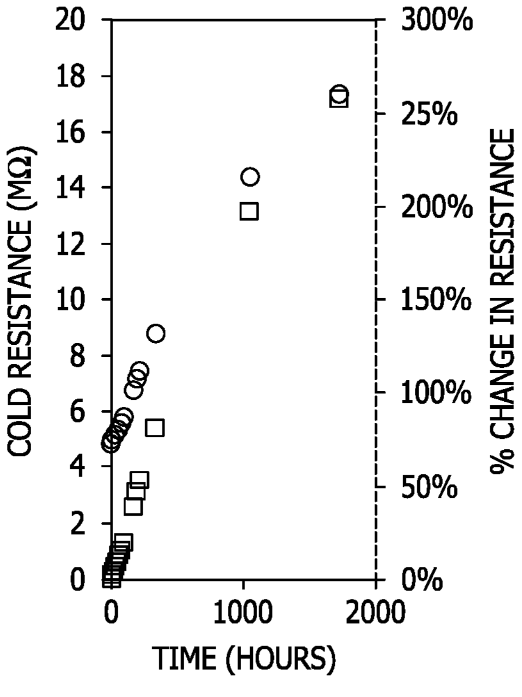
FIG. 3A is a plot of the cold resistance of an exemplary fuse having a ferrule made of aluminum alloy without plating.
Figure 3B:
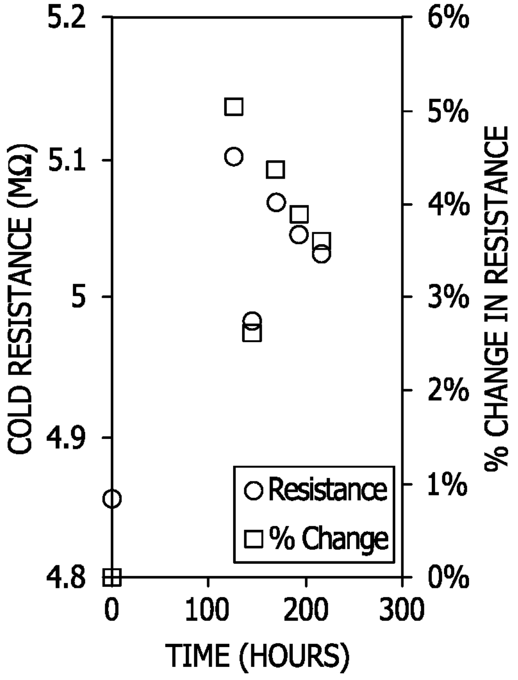
FIG. 3B is a plot of the cold resistance of an exemplary fuse having a ferrule made of aluminum alloy with plating.

In fuse 100, 200, the chosen type of aluminum alloy has high enough strength for ferrule 104, 106 to hold onto housing 102, and for eyelet 114 to hold fusible wire 112, 202 underneath if aluminum alloy is used for eyelet 114. AL1100 may be too soft for some applications. In some embodiments, aluminum alloy used for fuse 100, 200 has a tensile strength a of approximately 138 MPa or higher. In some embodiments, aluminum alloy used for fuse 100, 200 has a yield strength $\sigma_Y$ of approximately 117 MPa or higher. In one embodiment, AL 5052 alloy is used for ferrule 104, 106 and eyelet 114.

does not work for plating aluminum or aluminum alloy with nickel, where nickel plated on aluminum or aluminum alloy tends to flake off or does not stick onto the surface of aluminum or aluminum alloy. Electroless nickel plating is used in the exemplary embodiment. FIGS. 3A and 3B show the comparison of electrical resistance of fuse 100 with aluminum alloy ferrules and an aluminum alloy eyelet when the aluminum alloy used is not plated with nickel (FIG. 3A) and when the aluminum alloy used is plated with nickel (FIG. 3B). Aluminum alloy 5052 is used in the example shown in FIGS. 3A and 3B. Because resistance is temperature dependent, cold resistance is measured at the room temperature with current less than 10% of the rate current of the fuse. Without plating, resistance can increase three folds after 2000 hours, which is less than three months (see FIG. 3A). With plating, however, resistance is stabilized and its change stays less than 6% (see FIG. 3B).

Figure 4:
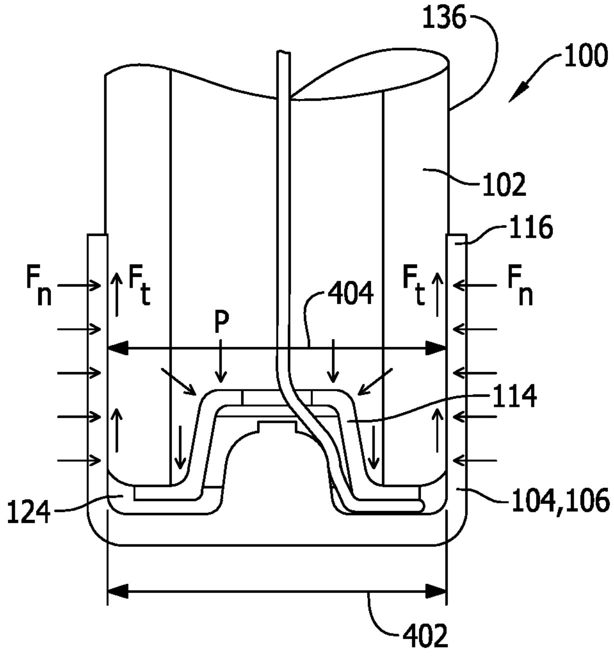
FIG. 4 illustrates the ferrule-tube interface force of the fuse shown in FIG. 1B.

When changing from copper or copper alloy to aluminum alloy as the material used to fabricate fuse 100, 200, ferrule-tube interface force is examined in the design of fuse 100, 200. FIG. 4 shows the effects of ferrule-tube interface force on ferrule 104, 106 and eyelet 114 of fuse 100. Although fuse 100 is depicted in FIG. 4, the discussion below similarly applies to fuse 200, 1200, 1300. Ferrule-tube interface force is the force at the interface between ferrule 104, 106 and housing 102 that keeps ferrule 104, 106 from disengaging with housing 102. During a high current short circuit event or breaking capacity testing, opening of fusible wire is associated with sudden release of energy that causes an arc to be generated inside the fuse. As a result of arcing, high pressure is developed inside the fuse, and the fuse housing and ferrule need to be able to withstand this high pressure and stay in place. The housing should not have visible defect after a short circuit event. Similarly, ferrules should also not have any visible defects including appreciable movement or dislodging from the housing as the fuse operates. To prevent movement or dislodging of ferrules, ferrules are restrained onto housing 102. In the absence of an additional restraining feature in the fuse design, the interface force between ferrule 104, 106 and housing 102 provides the restraining force.

Interface force is due to the friction between housing 102 and ferrules 104, 106, i.e., a friction force $F_t$. Friction force $F_t$ is equal to the product of coefficient of friction and normal force $F_n$. Normal force $F_n$ depends on the elasticity of the material (Youngs Modulus E) and yield strength $\sigma_Y$. Because, for aluminum alloys, Youngs Modulus E is approximately 30% less than copper alloys and yield strength $\sigma_Y$ is approximately 30% to 36% less than copper alloys (see Table 1), interface tolerance is, therefore, a factor to consider in designing ferrule, in addition to aluminum alloy selection and design of ferrule thickness. Interface tolerance is the difference between an inner diameter 402 of interior receptacle 124 formed by ferrule 104, 106 and an outer diameter 404 of housing 102. In some embodiments, fuse 100, 200 is designed to have a friction force of approximately 150 Newton or higher. In one embodiment, inner diameter 402 of interior receptacle 124 is greater than outer diameter 404 of housing 102 by approximately 20 μm or less. Diameters 402, 404 are measured at a region of side wall 116 of ferrule 104, 106 or a region of wall 136 of housing 102, where side wall 116 and wall 136 touch each other. In some embodiments, AL 5005 H32 aluminum alloy is used for ferrule 104, 106.

During a fuse's normal service life, the fuse is subjected to constant temperature changes, and internal pressure exerted on the ends of the fusible wire causes axial movement of the ferrule in relation to the fuse housing. In some embodiments, an aluminum alloy eyelet may not provide sufficient strength to provide a stable contact resistance between fusible wire 112, 202 and ferrule 104, 106 after such temperature changes or internal pressure surge. Brass eyelets or eyelets made of copper or other copper alloy may be used to handle the internal pressure and keep resistance stable.

In time delay fuses, the fuses are designed to allow a current that is above the rate value of the fuse to flow for a short period of time without the fuse opening. Time-delay fuses are useful for equipment such as motors, which draws larger than normal currents for a short period time to allow the equipment to come up to speed. But if the above-rated current is on for a long period of time, the fuse is open from the heat caused by the current.

Figure 5:
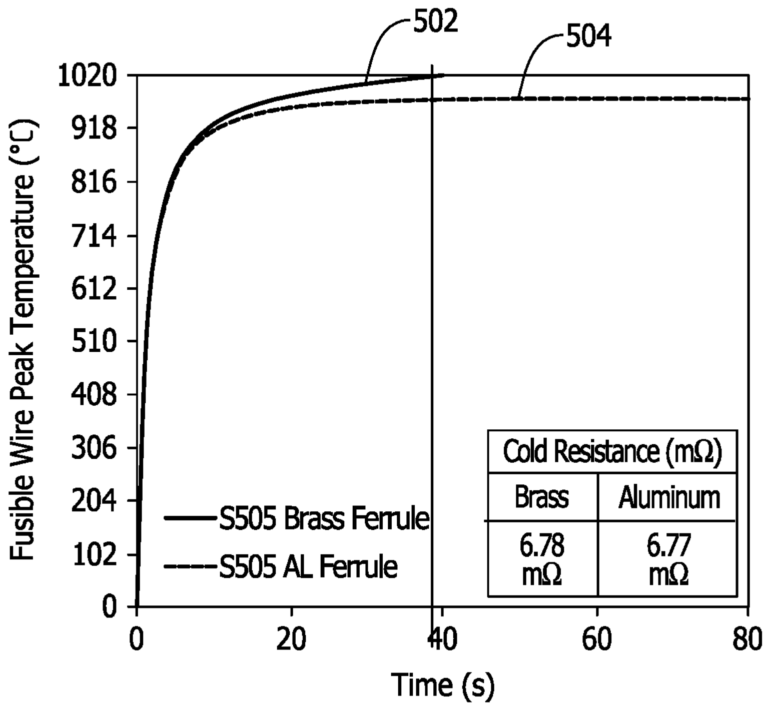
FIG. 5 is a plot showing the peak temperature of the fusible wires in two fuses, one with its ferrules made of brass and the other with its ferrules made of aluminum alloy.

FIG. 5 shows curves of simulated fusible wire temperature for a brass S505 fuse having a brass ferrule (shown as a curve 502) and an AL S505 fuse having a ferrule made of AL5052 aluminum alloy (shown as a curve 504). S505 fuse is a time delay fuse with its fusible wire soldered onto the ferrule. The insert shows cold resistance of the brass S505 and the AL S505 fuses used for the simulation. The fusible wires of the brass S505 and the AL S505 fuses are made of the same material. Resistance from the fusible wire dominates the resistance of the fuse, and thus, the resistance of the two fuses is almost the same. When above-rated current is conducted through the brass S505 fuse, the temperature of the fuse rises to the melting temperature of the solder and the fuse is opened (see curve 502). In contrast, the temperature of the fusible wire of the AL S505 fuse rises initially, but then reaches a plateau after 40 s (see curve 504). The AL S505 fuse never opens. In designing time delay fuses using aluminum alloy, aluminum alloy having high electrical resistivity and low thermal conductivity is chosen to maintain the time-current performances at overload conditions. In some embodiments, AL 5154 is chosen. With its thermal conductivity of 125 W/mK, which is close to that of brass material of 116 W/mK, the ferrule is heated up to the melting temperature and the fuse retains its functionality as a time delay fuse.

Figure 6A:
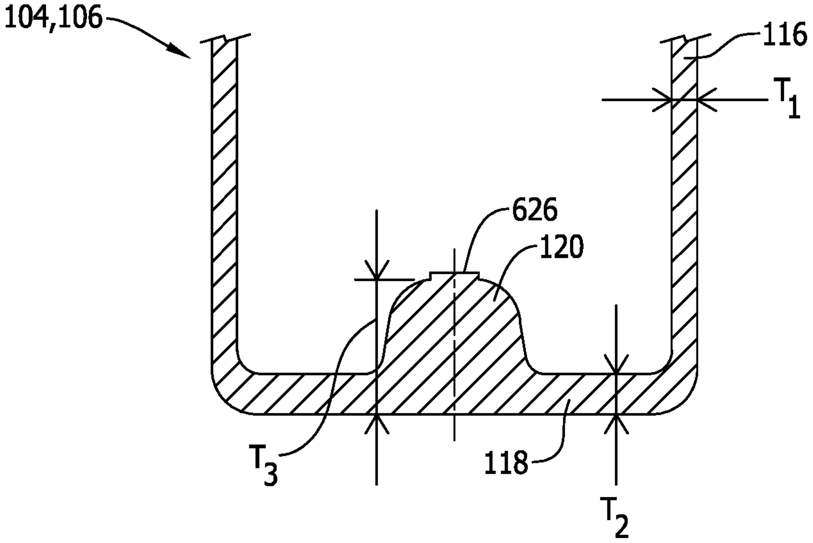
FIG. 6A is an enlarged view of the ferrule of the fuse shown in FIG. 1B.

FIG. 6A shows an enlarged view of ferrule 104, 106. Ferrule 104, 106 includes boss 120. Thickness $T_2$ of end wall 118 is greater than thickness $T_1$ of side wall 116. Thickness $T_2$ is measured at a location of end wall 118 other than boss 120. In one embodiment, thickness $T_1$ is approximately 0.325 mm and thickness $T_2$ is approximately 0.55 mm.

Figure 6B:
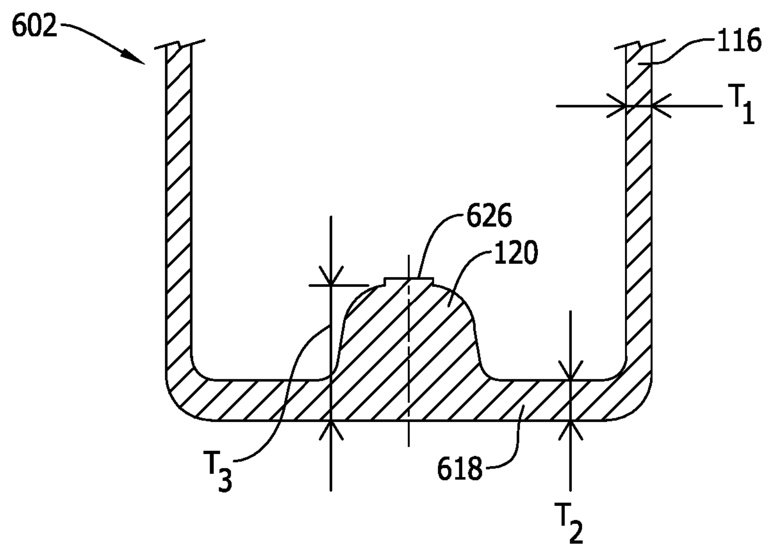
FIG. 6B is another exemplary ferrule for the fuse shown in FIG. 1B.
Figure 6C:
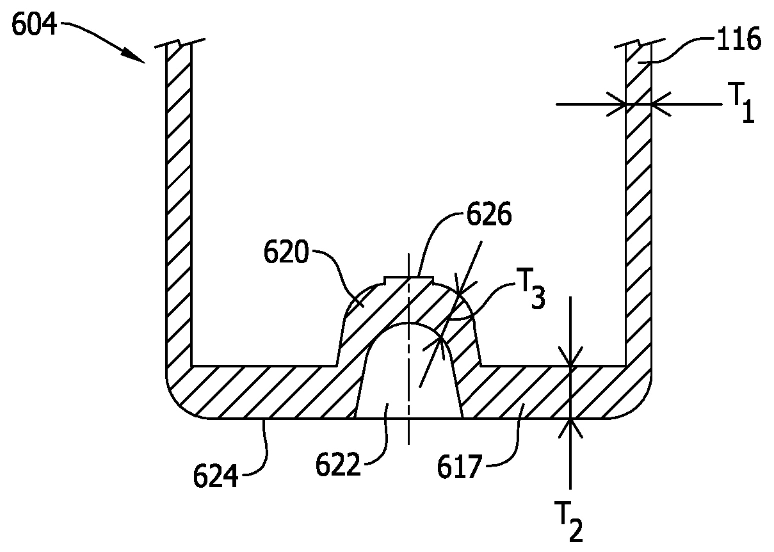
FIG. 6C is yet another exemplary ferrule for the fuse shown in FIG. 1B.
Figure 6D:
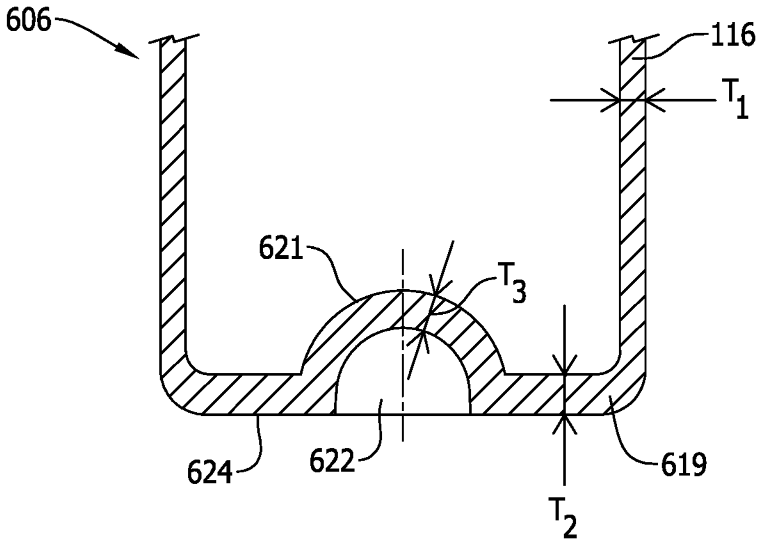
FIG. 6D is one more exemplary ferrule of the fuse shown in FIG. 1B.

FIGS. 6B-6D show other exemplary embodiments of a ferrule 602, 604, 606. Ferrule 602, 604, 606 can be used on fuse 100, 200 in the place of ferrule 104, 106. Ferrule 602 (shown in FIG. 6B) is similar to ferrule 104, 106 (shown in FIG. 6A) except thickness $T_2$ of an end wall 618 is slightly greater than or approximately equal to thickness $T_1$ of side wall 116 for ferrule 602. In FIGS. 6B-6D, thickness $T_2$ of end wall 617, 618, 619 is measured at a location other than boss 120, 620, 621. In one embodiment, for ferrule 602, thickness $T_1$ is approximately 0.325 mm and thickness $T_2$ is approximately 0.36 mm. Ferrule 604, 606 also has thickness $T_2$ of end wall 617, 619 greater than thickness $T_1$ of side wall 116. In one embodiment, thickness $T_1$ of side wall 116 is approximately 0.325 mm for ferrule 604, 606, and thickness $T_2$ of end wall 617 is approximately 0.58 mm for ferrule 604 and approximately 0.36 mm for ferrule 606.

Compared to ferrule 104, 106, ferrule 604, 606 has different configurations of boss 620, 621 (see FIGS. 6C and 6D). Boss 620, 621 includes a recess 622 at an exterior surface 624 of end wall 617, 619. Solder can be deposited in recess 622 to strengthen electrical contact between fuse 100, 200 and circuit components or circuit board that fuse 100, 200 connects to. Thickness $T_3$ of boss 620, 621 is greater than thickness $T_2$ of end wall 118 at a location other than boss 620, 621. In one embodiment, thickness $T_3$ of boss 120 is approximately 1.6 mm (shown in FIGS. 6A and 6B). Thickness $T_3$ of boss 620 is approximately 0.61 mm (shown in FIG. 6C). Thickness $T_3$ of boss 621 is approximately 0.4 mm (shown in FIG. 6D). Boss 120, 620 has thicker end wall than the rest of end wall 118, 617, 618, 619, which helps contain the heat from fusible wire 112, 202 as boss 120, 620 directly contacts fusible wire 112, 202. In some embodiments, boss 120, 620 include a relatively flat top surface 626. Relatively flat top surface 626 allows a good contact between fusible wire 202 and end wall 118, 617, 618 when fusible wire 202 is directly soldered onto end wall 118, 617, 618.

Figure 7:
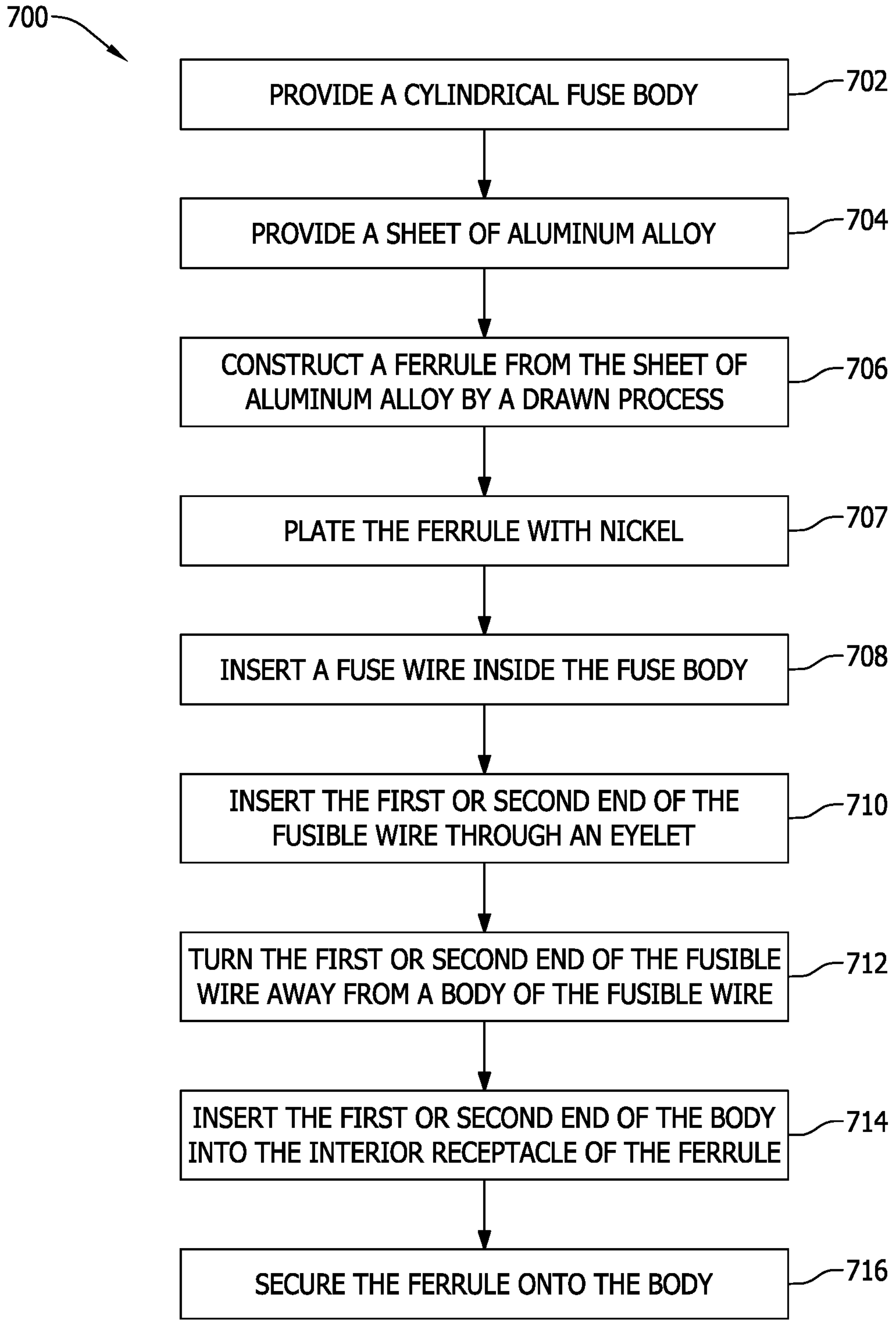
FIG. 7 is a flow chart illustrating an exemplary method of fabricating a fuse.

FIG. 7 shows an exemplary method 700 of fabricating a high capacity miniature cartridge fuse such as fuses 100 and 200 (shown in FIGS. 1A-2). Method 700 includes providing 702 a cylindrical housing. Method 700 further includes providing 704 a sheet of aluminum alloy. The sheet of aluminum alloy may be applied with a first heat treatment to improve the performance of the metal, for example, increasing the strength of the metal. Method 700 also includes constructing 706 a ferrule from the sheet of aluminum alloy by a drawn process. The drawn process may be a deep drawn process. Method 700 further includes plating 707 the ferrule with nickel. A second heat treatment, e.g., annealing, may be applied to the ferrule to improve the performance of the ferrule, for example, increasing the strength of the ferrule. Further, method 700 includes inserting 708 a fusible wire inside the housing. Moreover, method 700 includes inserting 710 the first or second end of the fusible wire through an eyelet. Method 700 further includes turning 712 the first or second end of the fusible wire away from a body of the fusible wire. Method 700 also includes inserting 714 the first or second end of the housing into the interior receptacle of the ferrule such that the first or second end of the fusible wire is held between a portion of the eyelet and the end wall of the ferrule. Further, method 700 includes securing 716 the ferrule onto the housing by clamping the ferrule around the first or second end of the housing.

The opening time, the time that takes the fuse to melt and interrupt the circuit under short-circuit and/or overcurrent conditions, may be used to classify fuses into fast acting fuses or time delay fuses. For example, at a given current of 10 Ampere flowing through the fuse, if the opening time is 0.1 seconds, the fuse may be classified as a fast acting fuse, while the fuse may be classified as a time delay fuse if the opening time is, for example, 10 seconds. The opening time of a fuse may be adjusted by adjusting the electrical resistance of the fuse. At a given current rating, the higher the electrical resistance of the fuse, the shorter is the opening time. In the exemplary embodiment, a fusible element 111 includes fusible wire 112 (see FIG. 8). The electrical resistance of fuse 101 (fuses 100, 200, 1200, 1300 are collectively referred to as fuses 101) may be adjusted by adjusting a diameter 802 of fusible wire 112. An increase in diameter 802 decreases the electrical resistance and hence increases the opening time. For example, for a 2 Ampere rated fuse at the current of 100 Ampere, the opening time of fuse 101 may be 0.001 seconds with a diameter 802 of 160 μm. Another 2 Ampere fuse at the current of 100 Ampere, the opening time of fuse 101 may be 0.00035 seconds with a diameter 802 of 65 μm. The electrical resistance and thermal resistance of fuse 101 may also be adjusted by adjusting a thickness 804 of ferrule 103 (ferrules 104, 106, 602, 604, 606 are collectively referred to as ferrules 103). Thickness 804 of ferrule 103 may be the thickness of end wall 119 (end walls 118, 617, 618, 619 are collectively referred to as end walls 119) or the thickness of side wall 116. The increase in thickness 804 decreases electrical resistance and thermal resistance and hence increases the opening time. For example, for an 2 Ampere rated fuse with end wall thickness of 550 μm may have an opening time of 0.1 to 0.2 seconds at 10 Ampere current and another 2 Ampere rated fuse with end wall thickness of 650 μm may have opening time of 0.6 to 0.8 seconds at 10 Ampere current.

When the diameter of the fusible element is small, such as 60 μm or less, the contact area between the fusible element and the fuse terminals like ferrules may be difficult to reliably establish, due to the small diameter of the fusible element. As a result, the electrical and thermal resistance of fuse 101 increases and in some cases may result in no connection at all depending on the variability in the manufacturing process. Assembling a fuse 101 having a small-diameter fusible element 111 that meets desired specifications including a target opening time is therefore difficult.

Figure 8:
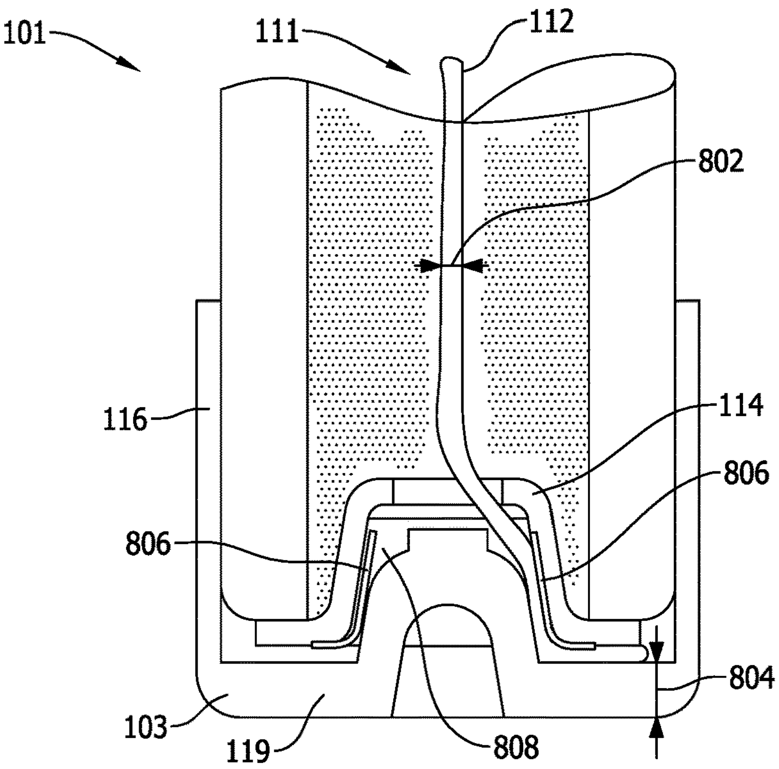
FIG. 8 is a partial cross-sectional view of one more exemplary fuse.

FIG. 8 shows another exemplary embodiment of a fuse 101 that can more easily be manufactured to meet desired performance objectives. Fuse 101 further includes a fusible paste 806. In the exemplary embodiment, fusible paste 806 is fabricated from tin or tin with a small percentage of silver such as 3% or less. However, fusible paste material is not restricted to these two. Fusible paste 806 is positioned between eyelet 114 and end wall 119. Fusible paste 806 holds the fusible element 111 to eyelet 114 and ferrule 103. In assembling fuse 101, fusible paste 806 may be deposited on end wall 119, eyelet 114, fusible wire 112, or any combination thereof. After fuse 101 is assembled with all desired elements included, fuse 101 is heated using a heating device such as an oven. Under the heat, fusible paste 806 melts and fuses into the spaces between eyelet 114 and end wall 119 and surrounding fusible wire 112, positively maintaining surface contact between the fusible wire 112 to eyelet 114 and/or end wall. As a result, the electrical and thermal contact between fusible wire 112 and ferrules 103 is enhanced by the fusible paste 106. In some embodiments, fusible paste 806 may also be deposited between end wall 119 and eyelet 114 at a location 808 away from fusible wire 112. Once heated, fusible paste fills a gap 810 between end wall 119 and eyelet 114, enhancing the electrical and thermal contact between eyelet 114 and ferrule 103 and the performance of fuse 101. This effectively lowers fuse resistance and realizes opening times that can otherwise be very difficult, if not impossible to realize. In some embodiments, ferrules 103 are fabricated from copper or copper alloy, although other conductive metals or metal alloys are likewise possible.

Figure 9A:
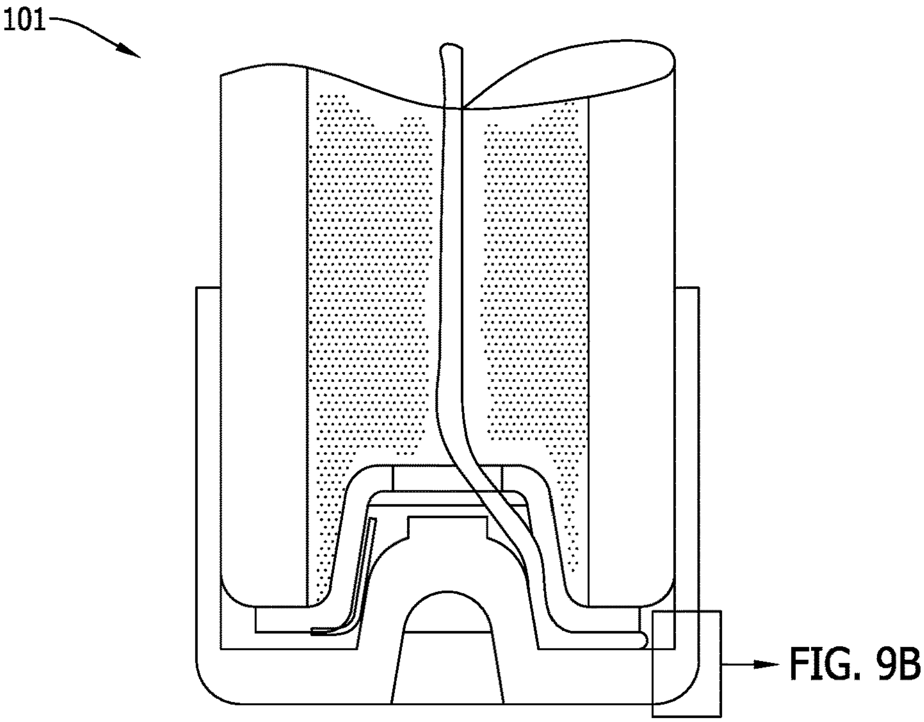
FIG. 9A is a partial cross-sectional view of one more exemplary fuse.
Figure 9B:
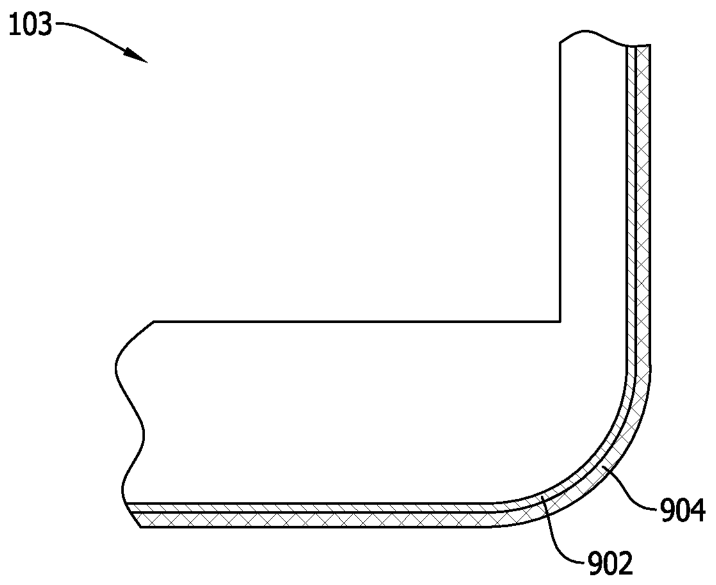
FIG. 9B is an enlarged view of a portion shown in FIG. 9A.

FIGS. 9A and 9B show one more exemplary embodiment of fuse 101. When ferrules 103 are fabricated with aluminum alloy, nickel is plated over ferrules 103 to prevent corrosion. To plate nickel to aluminum alloy, electroless plating is used, because if conventional plating, i.e., plating with electrodes, the plating tends to be flaky and has a tendency to disintegrate.

In the exemplary embodiment, ferrule 103 includes a first metal plating 902 and a second metal plating 904. First metal plating 902 is fabricated from a first metal different from aluminum alloy, such as copper or copper alloy. A thickness 804 of first metal plating 902 may be in the order of μm, such as approximately 1-9 μm. Second metal plating 904 is fabricated from a second metal different from the first metal, such as nickel or tin. First metal plating 902 overlays the aluminum alloy. Second metal plating 904 overlays first metal plating 902. The plating of first and second metal plating 902, 904 is not limited, however, to electroless plating. Other types of plating are known and may be used in further embodiments. Fuses 101 as described herein are tested to sustain salt spray tests for corrosion, showing fuses 101 resistant to corrosion. As a result, the life of fuse 101 is increased and/or fuse 101 is suitable to be used in a harsh and/or hazardous environment, which has an elevated level of corrosive substance present.

Various embodiments of fuses are described herein including copper or copper alloy components replaced with aluminum alloy components having characteristics suitable for the performance and specifications of the fuses, thereby dramatically reducing manufacturing costs for the fuses. Plating aluminum alloy with nickel reduces or eliminates oxidation of aluminum alloy, thereby allowing cold resistance of the fuses to remain unchanged or to change little over time such that the fuses have reliable performance.

Plating aluminum alloy with copper before being plated with nickel does not limit plating techniques to electroless plating, thereby increasing manufacturing flexibility and reducing manufacturing costs. Additionally, embodiments of system and methods provide aluminum alloy fuses that can withstand constant temperature changes and pressure surges. For example, the tolerance between the inner diameter of the interior receptacle formed by the ferrule and the outer diameter the fuse housing is tight, thereby the interface force between the ferrule and fuse housing is sufficient to allow the ferrule remaining in place through the fuse's life of service. In addition, a fusible paste is used to weld a fusible element to the eyelet and the end wall of the ferrule, thereby enhancing the performance of the fuse. Further, resistance of the fuse is adjusted based on a specification of the opening time, thereby providing fuses having various opening time.

While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from that described and depicted without departing from inventive concepts described. Also, in certain embodiments, certain components in the assemblies described may be omitted to accommodate particular types of fuses or the needs of particular installations, while still providing the needed performance and functionality of the fuses.

The benefits and advantages of the inventive concepts are now believed to have been amply illustrated in relation to the exemplary embodiments disclosed.

An embodiment of a high-capacity miniature cartridge fuse has been disclosed. A fuse includes a cylindrical housing having opposing first and second ends, a fusible wire positioned inside the housing and including opposing first and second ends, and first and second deep-drawn ferrules fabricated from aluminum alloy. The first and second ferrules are respectively attached to the first and second ends of the housing and electrically connected to the respective first and second ends of the fusible wire, the aluminum alloy being plated with nickel. Each of the first and second ferrules includes a side wall and an end wall. The side wall surrounds the first or second end of the housing, wherein the side wall has a thickness of approximately 0.50 mm or less. The end wall extends from the side wall and closes the first or second end of the housing, wherein the end wall includes a boss extending toward an interior of the housing and defining an interior surface of the end wall, and the end wall has a thickness greater than a thickness of the side wall. The side wall and the end wall define an interior receptacle that is sized to receive the first or second end of the housing.

Optionally, the nickel plating may be electroless nickel plating. The aluminum alloy may have a tensile strength of approximately 138 MPa or higher. The aluminum alloy may have a yield strength of approximately 117 MPa or higher. The aluminum alloy may have a melting point of approximately 590° C. or higher. A friction force between the side wall of the first or second ferrule and the housing may be approximately 150 Newton or higher. An inner diameter of the interior receptacle may be greater than an outer diameter of the housing by approximately 20 μm or less. The fuse may include two or more fusible wires. The fuse may further include an eyelet extending adjacent the interior surface of the end wall of the first or second ferrule. The fusible wire may extend through the eyelet and be held between a portion of the eyelet and the end wall of the first or second ferrule. The fuse may be configured as a time delay fuse, and the aluminum alloy may have a thermal conductivity of approximately 125 W/m·K or lower and an electrical resistivity of approximately $5.32\times10^{-6}$ Ω-cm or higher.

An embodiment of a method of fabricating a high capacity miniature cartridge fuse has also been disclosed. The method includes providing a cylindrical housing, wherein the housing includes opposing first and second ends, and providing a sheet of aluminum alloy. The method also includes constructing a ferrule from the sheet of aluminum alloy by a deep drawn process. The ferrule includes a side wall and an end wall extending from the side wall. The side wall and the end wall define an interior receptacle that is sized to receive the first or second end of the housing. The side wall has a thickness of approximately 0.50 mm or less. The end wall includes a boss extending from the end wall in the same direction as the side wall and defining an interior surface of the end wall, and the end wall has a thickness greater than a thickness of the side wall. The method also includes plating the ferrule with nickel. The method further includes inserting a fusible wire inside the housing, wherein the fusible wire includes opposing first and second ends. Moreover, the method includes inserting the first or second end of the fusible wire through an eyelet. The method also includes turning the first or second end of the fusible wire away from a body of the fusible wire. The method further includes inserting the first or second end of the housing of the fuse into the interior receptacle of the ferrule such that the first or second end of the fusible wire is held between a portion of the eyelet and the end wall of the ferrule. The method also includes securing the ferrule onto the housing by clamping the ferrule around the first or second end of the housing.

Optionally, in the method of fabricating a high capacity miniature cartridge fuse, the nickel plating may be electroless nickel plating. The aluminum alloy may have a tensile strength of approximately 138 MPa or higher. The aluminum alloy may have a yield strength of approximately 117 MPa or higher. The aluminum alloy may have a melting point of approximately 590° C. or higher. A friction force between the side wall of the ferrule and the housing may be approximately 150 Newton or higher. An inner diameter of the interior receptacle may be greater than an outer diameter of the housing by approximately 20 μm or less. The end wall may include a recess in an exterior surface of the end wall. A thickness of the boss may be greater than a thickness of the end wall at a location other than the boss. Providing a sheet of aluminum alloy may further include applying a first heat treatment to the sheet of aluminum alloy. The method may further include applying a second heat treatment to the ferrule. The fuse may be configured as a time delay fuse, and the aluminum alloy may have a thermal conductivity of approximately 125 W/m·K or lower and an electrical resistivity of approximately $5.32\times10^{-6}$ Ω-cm or higher.

Another embodiment of a high-capacity miniature cartridge fuse has been disclosed. The fuse includes a housing having opposing first and second ends, a fusible element positioned inside the housing, and first and second ferrules fabricated from aluminum alloy. The aluminum alloy ferrules is fabricated to withstand high pressure generated inside the housing as a result of arcing and to stay in place after repeated temperature and pressure changes caused by at least one of i) current or ii) arcing during short circuit events. The first and second ferrules are electrically connected to the fusible element. The aluminum alloy is plated with a first metal plating fabricated from a first metal different from the aluminum alloy and a second metal plating fabricated from a second metal different from the first metal, the second metal plating overlaying the first metal plating. Each of the first and second ferrules includes a side wall and an end wall extending from the side wall and closing the first or second end of the housing, wherein the end wall includes a boss extending toward an interior of the housing. The side wall and the end wall define an interior receptacle that is sized to receive the first or second end of the housing.

Optionally, the first metal includes copper or copper alloy. The second metal includes nickel. Alternatively, the second metal includes tin. The boss defines an interior surface of the end wall, the fuse further includes an eyelet extending adjacent the interior surface, and the fusible element includes a fusible wire extending through the eyelet and held between the eyelet and the end wall. The fuse further includes a fusible paste positioned between the eyelet and the end wall and welding the fusible wire to the eyelet and the end wall. A diameter of the fusible wire is 60 μm or less. Electrical resistance of the fuse is adjusted based on a specification of opening time of the fuse. The fusible element includes a fusible wire, wherein a diameter of the fusible wire is adjusted based on the specification. A thickness of at least one of the ferrules is adjusted based on the specification.

One more embodiment of a high-capacity miniature cartridge fuse has been disclosed. The fuse includes a cylindrical housing having opposing first and second ends, a fusible element positioned inside the cylindrical housing and including opposing first and second ends, and first and second deep-drawn ferrules fabricated from aluminum alloy. The aluminum alloy ferrules are fabricated to withstand high pressure generated inside the cylindrical housing as a result of arcing and to stay in place after repeated temperature and pressure changes caused by at least one of i) current or ii) arcing during short circuit events. The first and second ferrules are respectively attached to the first and second ends of the cylindrical housing and electrically connected to the respective first and second ends of the fusible element, The aluminum alloy is plated with nickel. Each of the first and second ferrules includes a side wall surrounding the first or second end of the cylindrical housing and an end wall extending from the side wall and closing the first or second end of the cylindrical housing. The end wall includes a boss extending toward an interior of the cylindrical housing and defining an interior surface of the end wall. The side wall and the end wall define an interior receptacle that is sized to receive the first or second end of the cylindrical housing. Electrical resistance of the fuse is adjusted based on a specification of opening time of the fuse.

Optionally, the aluminum alloy has a thermal conductivity of approximately 125 W/m·K or lower and an electrical resistivity of approximately $5.32\times10^{-6}$ Ω-cm or higher. The fusible element includes a fusible wire, and a diameter of the fusible wire is adjusted based on the specification. A thickness of at least one of the ferrules is adjusted based on the specification.

One more embodiment of a high-capacity miniature cartridge fuse has been disclosed. The fuse includes a housing having opposing first and second ends, a fusible element positioned inside the housing, first and second ferrules, an eyelet, and a fusible paste. The first and second ferrules are electrically connected to the fusible element. Each of the first and second ferrules includes a side wall and an end wall extending from the side wall and closing the first or second end of the housing, wherein the end wall includes a boss extending toward an interior of the housing and defining an interior surface of the end wall. The eyelet extends adjacent the interior surface of the end wall. The fusible element extends through the eyelet and held between the eyelet and the end wall, the fusible paste positioned between the eyelet and the end wall and welding the fusible element to the eyelet and one of the ferrules.

Optionally, the ferrules are fabricated from aluminum alloy. The aluminum alloy is plated with a first metal plating fabricated from a first metal different from the aluminum alloy and a second metal plating fabricated from a second metal different from the first metal, the second metal plating overlaying the first metal plating. The first metal includes copper or copper alloy. The second metal includes at least one of nickel or tin. The fusible element includes a fusible wire, and a diameter of the fusible wire is 60 μm or less.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A high-capacity miniature cartridge fuse comprising:
- a housing having opposing first and second ends;
- a fusible element positioned inside the housing; and
- first and second ferrules fabricated from aluminum alloy, the aluminum alloy ferrules fabricated to withstand pressure generated inside the housing as a result of arcing and to stay in place after temperature or pressure changes caused by at least one of i) current or ii) arcing during short circuit events, wherein the first and second ferrules are electrically connected to the fusible element, the aluminum alloy plated with a first metal plating fabricated from a first metal different from the aluminum alloy and a second metal plating fabricated from a second metal different from the first metal, the second metal plating overlaying the first metal plating, each of the first and second ferrules comprising:
  - a side wall; and
  - an end wall extending from the side wall and closing the first or second end of the housing, wherein the end wall includes a boss extending toward an interior of the housing, wherein the side wall and the end wall define an interior receptacle that is sized to receive the first or second end of the housing,
- wherein the fusible element comprises a fusible wire having a first end and a second end, wherein the first end of the fusible wire is configured to be in contact with the boss of the first ferrule, and wherein the second end of the fusible wire is configured to not be in contact with the boss of the second ferrule.

2. The fuse of claim 1, wherein the first metal comprises copper or copper alloy.

3. The fuse of claim 1, wherein the second metal comprises nickel.

4. The fuse of claim 1, wherein the second metal comprises tin.

5. The fuse of claim 1, wherein, for each of the first and second ferrules, the respective boss defines an interior surface of the respective end wall and an eyelet extends adjacent the respective interior surface, and wherein each of the first and second ends of the fusible wire is configured to extend through the respective eyelet.

6. The fuse of claim 5, further comprising, for each of the first and second ferrules, a fusible paste positioned between the respective eyelet and the respective end wall and welding a portion of the fusible wire to the respective eyelet.

7. The fuse of claim 5, wherein a diameter of the fusible wire is 60 μm or less.

8. The fuse of claim 1, wherein electrical resistance of the fuse is adjusted based on a specification of opening time of the fuse.

9. The fuse of the claim 8, wherein a diameter of the fusible wire is adjusted based on the specification of the opening time of the fuse.

10. The fuse of claim 8, wherein a thickness of at least one of the first and second ferrules is adjusted based on the specification of the opening time of the fuse.

11. A high-capacity miniature cartridge fuse comprising:

a cylindrical housing having opposing first and second ends:

a fusible element positioned inside the cylindrical housing and including opposing first and second ends: and first and second deep-drawn ferrules fabricated from aluminum alloy, the aluminum alloy first and second deep-drawn ferrules fabricated to withstand pressure generated inside the cylindrical housing as a result of arcing and to stay in place after temperature or pressure changes caused by at least one of i) current or ii) arcing during short circuit events, wherein the first and second deep-drawn ferrules are respectively attached to the first and second ends of the cylindrical housing and electrically connected to the respective first and second ends of the fusible element, the aluminum alloy being plated with nickel, each of the first and second deep-drawn ferrules comprising:

a side wall surrounding the first or second end of the cylindrical housing; and an end wall extending from the side wall and closing the first or second end of the cylindrical housing, wherein the end wall includes a boss extending toward an interior of the cylindrical housing and defining an interior surface of the end wall, wherein the side wall and the end wall define an interior receptacle that is sized to receive the first or second end of the cylindrical housing, wherein the fusible element comprises a fusible wire having a first end and a second end, wherein the first end of the fusible wire is configured to be in contact with the boss of the first ferrule, and wherein the second end of the fusible wire is configured to not be in contact with the boss of the second ferrule, and wherein electrical resistance of the fuse is adjusted based on a specification of opening time of the fuse.

12. The fuse of claim 11, wherein the aluminum alloy has a thermal conductivity of approximately 125 W/m·K or lower and an electrical resistivity of approximately $5.32\times10^{-6}$ Ω-cm or higher.

13. The fuse of claim 11, wherein a diameter of the fusible wire is adjusted based on the specification of the opening time of the fuse.

14. The fuse of claim 11, wherein a thickness of at least one of the first and second deep-drawn ferrules is adjusted based on the specification of the opening time of the fuse.

15. A high-capacity miniature cartridge fuse comprising:

a housing having opposing first and second ends;

a fusible element positioned inside the housing;

first and second ferrules, wherein the first and second ferrules are electrically connected to the fusible element, each of the first and second ferrules comprising:

a side wall; and an end wall extending from the side wall and closing the first or second end of the housing, wherein the end wall includes a boss extending toward an interior of the housing and defining an interior surface of the end wall;

a first eyelet extending adjacent the respective interior surface of the end wall associated with the first ferrule, and a second eyelet extending adjacent the respective interior surface of the end wall associated with the second ferrule; and a fusible paste, wherein the fusible element comprises a fusible wire having a first end and a second end, wherein the first end of the fusible wire is configured to be in contact with the boss of the first ferrule, and wherein the second end of the fusible wire is configured to not be in contact with the boss of the second ferrule, and wherein the second end of the fusible wire extends through the second eyelet and held between the second eyelet and the end wall associated with the second ferrule, the fusible paste positioned between the second eyelet and the end wall associated with the second ferrule and welding the second end of the fusible wire to the second eyelet and the second ferrule.

16. The fuse of claim 15, wherein the first and the second ferrules are fabricated from aluminum alloy.

17. The fuse of claim 16, wherein the aluminum alloy is plated with a first metal plating fabricated from a first metal different from the aluminum alloy and a second metal plating fabricated from a second metal different from the first metal, the second metal plating overlaying the first metal plating.

18. The fuse of claim 17, wherein the first metal comprises copper or copper alloy.

19. The fuse of claim 17, wherein the second metal comprises at least one of nickel or tin.

20. The fuse of claim 15, wherein a diameter of the fusible wire is 60 μm or less.

* * * * *